(12) United States Patent
Gogotsi et al.

(10) Patent No.: US 11,862,847 B2
(45) Date of Patent: *Jan. 2, 2024

(54) ANTENNAS COMPRISING MX-ENE FILMS AND COMPOSITES

(71) Applicant: Drexel University, Philadelphia, PA (US)

(72) Inventors: Yury Gogotsi, Warminster, PA (US); Babak Anasori, Norristown, PA (US)

(73) Assignee: Drexel University, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/935,162

(22) Filed: Sep. 26, 2022

(65) Prior Publication Data
US 2023/0038621 A1 Feb. 9, 2023

Related U.S. Application Data

(63) Continuation of application No. 16/327,495, filed as application No. PCT/US2017/048127 on Aug. 23, 2017, now Pat. No. 11,456,527.
(Continued)

(51) Int. Cl.
*H04B 1/40* (2015.01)
*H01Q 1/38* (2006.01)
(Continued)

(52) U.S. Cl.
CPC ......... *H01Q 1/368* (2013.01); *C01B 21/0602* (2013.01); *C01B 32/921* (2017.08);
(Continued)

(58) Field of Classification Search
CPC . H01Q 1/368; H01Q 1/38; H01Q 9/16; C01B 1/00; C01B 5/24; C01B 21/0682; C01B 32/90; C01B 32/914; C01B 32/921; H04B 1/04; H04B 1/18; H04B 1/40; C01P 2004/12; C01P 2004/24; C01P 2006/40
See application file for complete search history.

(56) References Cited

U.S. PATENT DOCUMENTS 9,193,595 B2 * 11/2015 Barsoum ............. H01M 10/052
10,744,060 B2 8/2020 Choudhury et al.
(Continued)

FOREIGN PATENT DOCUMENTS

CN 105418072 A 3/2016
WO 2012/177712 A1 12/2012
(Continued)

OTHER PUBLICATIONS

Anasori et al., "Two-Dimensional, Ordered, Double Transition Metals Carbines (MXenes)", ACS Nano, Jul. 2015, vol. 9, No. 10, pp. 9507-9951.
Chiolerio et al., "Ag Nanoparticle-Based Inkjet Printed Planar Transmission Lines for RF and Microwave Applications: Considerations on Ink Composition, Nanoparticle Size Distribution and Sintering Time" Microelectronic Engineering, 2012, vol. 97, pp. 8-15.
(Continued)

*Primary Examiner* — Blane J Jackson
(74) *Attorney, Agent, or Firm* — BakerHostetler

(57) ABSTRACT

The present disclosure is directed to antennas for transmitting and/or receiving electrical signals comprising a MXene composition, devices comprising these antennas, and methods of transmitting and receiving signals using these antennas.

20 Claims, 11 Drawing Sheets

Related U.S. Application Data

(60) Provisional application No. 62/379,399, filed on Aug. 25, 2016.

(51) Int. Cl.

| | | |
|---|---|---|
| *H01Q 1/36* | (2006.01) | |
| *H01Q 9/16* | (2006.01) | |
| *C01B 21/06* | (2006.01) | |
| *C01B 32/921* | (2017.01) | |
| *C09D 1/00* | (2006.01) | |
| *C09D 5/24* | (2006.01) | |
| *H04B 1/04* | (2006.01) | |
| *H04B 1/18* | (2006.01) | |

(52) U.S. Cl.
CPC ............... *C09D 1/00* (2013.01); *C09D 5/24* (2013.01); *H01Q 9/16* (2013.01); *H04B 1/04* (2013.01); *H04B 1/18* (2013.01); *C01P 2004/24* (2013.01); *C01P 2006/40* (2013.01); *H01Q 1/38* (2013.01)

(56) References Cited

U.S. PATENT DOCUMENTS

| | | | |
|---|---|---|---|
| 2007/0231487 A1* | 10/2007 | Ishizaka | C23C 16/45574 427/249.17 |
| 2009/0027266 A1 | 1/2009 | Mohamadi | |
| 2011/0284643 A1 | 11/2011 | Yamagajo et al. | |
| 2014/0162130 A1 | 6/2014 | Barsoum et al. | |
| 2017/0294546 A1 | 10/2017 | Ghidiu et al. | |
| 2018/0108910 A1 | 4/2018 | Barsoum et al. | |
| 2018/0179070 A1 | 6/2018 | Zhang et al. | |

FOREIGN PATENT DOCUMENTS

| | | |
|---|---|---|
| WO | 2013/128299 A1 | 9/2013 |
| WO | 2014/088995 A1 | 6/2014 |
| WO | 2016/049109 A2 | 3/2016 |
| WO | 2016/140948 A1 | 9/2016 |
| WO | 2017/011044 A2 | 1/2017 |

OTHER PUBLICATIONS

Database WPI Week 201642 Thomson Scientific, London, GB; AN 2016-19635N, XP002798403.

Ghidiu et al., "Conductive Two-Dimensional Titanium Carbide 'Clay' with High Volumetric Capacitance", Nature, 2014, vol. 516, pp. 78-89.

Han et al., "Ti3C2 MXenes with Modified Surface for High-Performance Electromagnetic Absorption and Shielding in the X-Band", ACS Applied Materials & Interfaces, Aug. 2016, vol. 8, No. 32, pp. 21011-21019.

Huang et al., "Binder-Free Highly Conductive Graphene Laminate for Low Cost Printed Radio Frequency Applications", Applied Physics Letters 106, Issue 203105, 2015, pp. 1-4.

Huang et al., "Graphene Radio Frequency and Microwave Passive Components for Low Cost Wearable Electronics", 2D Materials, 2016, vol. 3, No. 025021, pp. 1-9.

Lamminen et al., "Graphene-Flakes Printed Wideband Elliptical Dipole Antenna for Low Cost Wireless Communications Applications", IEEE Antennas and Wireless Propagation Letters, 2017, pp. 1-5.

Naguib et al, "Two-Dimensional Transition Metal Carbides", American Chemical Society, Feb. 2012, vol. 6, No. 2, pp. 1322-1331.

Pozar, "Microwave engineering", John Wiley & Sons, 2009, Edition 4th, pp. 1-756.

Shin et al., "Graphene/Polyaniline/Poly (4-styrenesulfonate) Hybrid Film with Uniform Surface Resistance and Its Flexible Dipole Tag Antenna Application", Small, 2013, vol. 9, No. 22, pp. 3792-3798.

Sidén et al., "Reduced Amount of Conductive Ink with Gridded Printed Antennas", Polymers and Adhesives in Microelectronics and Photonics, IEEE Polytronic, 2005, pp. 1-4.

U.S. Provisional Application filed on Mar. 4, 2015, by Barsoum et al., U.S. Appl. No. 62/127,907.

Vacirca et al., "Onion-like Carbon and Carbon Nanotube Film Antennas", Applied Physics Letters 103, Issue 073301, 2013, pp. 1-5.

Zou et al., "Synthesis of MXene/Ag Composites for Extraordinary Long Cycle Lifetime Lithium Storage at High Rates", Applied Materials & Interfaces, Aug. 2016, vol. 8, pp. 22280-22286.

\* cited by examiner

ANTENNAS COMPRISING MX-ENE FILMS AND COMPOSITES

CROSS REFERENCE TO RELATED APPLICATIONS

This application is a continuation of now-allowed U.S. Patent Application No. 16/327,495, filed Feb. 22, 2019; which application is the National Stage Application of International Patent Application No. PCT/US2017/048127, filed Aug. 23, 2017; which application claims priority to U.S. patent application Ser. No. 62/379,399, filed Aug. 25, 2016, the contents of which foregoing applications are incorporated by reference herein in their entireties for any and all purposes.

TECHNICAL FIELD

The present disclosure relates to antenna configurations comprising MXene films and composites.

BACKGROUND

MXenes are a family of two-dimensional (2D) transition metal carbides, nitrides and carbonitrides discovered at Drexel University in 2011. Over the past few years, a growing family of about 20 different 2D MXenes have been synthesized and explored. MXenes, which were derived from the corresponding layered ternary and quaternary carbides and nitrides, e.g., MAX phase materials with a formula of $M_{n+1}AX_n$, where M is an early transition metal, A is a III or IV A-group element and X is carbon and/or nitrogen. The exfoliation process was carried out by selectively etching the A layers to provide compositions with 2D layers of $M_{n+1}X_n$ terminated with OH/F groups. These new phases were named as MXene to emphasize their graphene-like morphology.

MXenes have important application in many areas, such as hydrogen storage, lead adsorption, energy storage, and polymer composites. The theoretical specific capacity of $Ti_3C_2$ anode has been predicted to be 320 mAh g$^{-1}$. MXenes are often metallic conductive, with large surface area due to their 2D flakes nature, but their antenna applications has never been studied, nor was there any suggestion that their properties would be particularly useful in this application. Subsequently, MXenes of the general formula $M'_2M''_nX_{n+1}$ were also discovered.

Antenna is a critical part in all radio frequency (RF) communication devices. Nowadays all the antennas are made mostly of metals (aluminum, copper, or silver). However, the performance of metal antennas is limited by a thickness which is called skin depth. It means that at radio frequencies the electric current only flows on the surface of a metal and the thickness of skin depth is depended on frequency. For example, skin depth for copper at the WiFi or Bluetooth frequency (2.4 GHz) is 1 micron.

As wearable devices are becoming more popular, the need for thinner and flexible antennas increases. However, manufacturing less than few microns copper and aluminum antennas is very expensive and complicated. The other solution is to make metal inks and print antenna, as there are already antennas and RFID tags made of printed copper or silver inks. The integration of antennas into textiles became possible with silver threads. However, having metal particles well dispersed in different solvents is another technological limitation. Recently the technology went beyond metals: the discovery of graphene opened new avenues for 2D materials in Radio frequency communications. Printed graphene antennas for RFID are now commercially available and reported values of attenuation are comparable with copper ones. However, conductivity of graphene is lower compared with MXene, which makes MXene a good candidate for wearable antennas. MXenes have another important advantage over many other materials for printable devices. Because of MXenes synthesis method, as-synthesized MXenes can be dispersed in different solvents including water. In other words, making MXene water based inks does not need any further processing.

SUMMARY

The present disclosure is directed to antennas for transmitting and/or receiving electrical signals, including electrical signals in a radio frequency range, the antennas comprising a MXene composition. Certain separate embodiments include those where the antennas are transmitting or receiving electrical signals and those where the antennas are not. The antennas may be operably coupled to a radio transmitter or a radio receiver by at least one transmission line. In certain embodiments, the antennas are monopole antennas; in other embodiments, the antennas are dipole antennas.

The MXene composition may comprise any composition described in previous disclosures, applications, and patents disclosing such structures. The antennas may comprise molded or formed bodies of the MXene materials, or may comprise substrates having MXene coatings. While not limited to any particular substrate, non-conductive substrates are preferred, including those comprising organic polymer, inorganic (e.g., glass or silicon), or fabric (including synthetic and natural fiber) substrates. Since MXene can be produced as a free-standing film, the antenna substrates can be almost any substrate material, with little dependence on morphology and roughness. The coatings or substrate bodies may comprises a binder, or be binder-free.

Additional embodiments include articles comprising the inventive antennas, for use in either transmitting or receiving mode.

Still further embodiments include methods of transmitting or receiving signals using these inventive antennas, whether by themselves or in context of the articles comprising the antennas.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIGS. 6(A-B) show schematics of devices used to analyze MXene performance in RF.

FIGS. 7(A-B) shows performance of various dipole antennas.

DETAILED DESCRIPTION OF ILLUSTRATIVE EMBODIMENTS

Figure 1A:
FIGS. 1(A-C) show digital photographs of MXene antennas made from: $Ti_3C_2$ (FIG. 1A), $Ti_2C$ (FIG. 1B), and $Mo_2TiC_2$ (FIG. 1C).

The present disclosure is directed to novel antennas comprising MXene compositions, articles incorporating these antennas, and methods of using these antennas and articles.

The present invention may be understood more readily by reference to the following description taken in connection with the accompanying Figures and Examples, all of which form a part of this disclosure. It is to be understood that this invention is not limited to the specific products, methods, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

Certain embodiments of the present disclosure include antennas for transmitting and/or receiving electrical signals, each antenna comprising a MXene composition. MXene composition are known but not in applications directed to antennas, and all such compositions are considered within the scope of this invention. In certain embodiments, wherein the MXene composition is any of the compositions described in at least one of U.S. patent application Ser. No. 14/094,966 (filed Dec. 3, 2013), 62/055,155 (filed Sep. 25, 2014), 62/214,380 (filed Sep. 4, 2015), 62/149,890 (filed Apr. 20, 2015), 62/127,907 (filed Mar. 4, 2015) or International Applications PCT/US2012/043273 (filed Jun. 20, 2012), PCT/US2013/072733 (filed Dec. 3, 2013), PCT/US2015/051588 (filed Sep. 23, 2015), PCT/US2016/020216 (filed Mar. 1, 2016), or PCT/US2016/028,354 (filed Apr. 20, 2016), preferably where the MXene composition comprises titanium and carbon (e.g., $Ti_3C_2$, $Ti_2C$, $Mo_2TiC_2$, etc.). Each of these compositions is considered independent embodiment. Similarly, MXene carbides, nitrides, and carbonitrides are also considered independent embodiments. Various MXene compositions are described elsewhere herein, and these and other compositions, including coatings, stacks, laminates, molded forms, and other structures, described in the above-mentioned references are all considered within the scope of the present disclosure.

In other embodiments, the antennas are capable of or actually do transmit and/or receive electrical signals in a radio frequency range, wherein the radio frequency is considered to span the kilohertz to gigahertz frequency range. In specific embodiments, these ranges can be defined in terms of a frequency range of from about 3 kHz to about 300 GHz, including a frequency defined by one or more of the ranges of from 3 kHz to 5 kHz, from 5 kHz to 10 kHz, from 10 kHz to 50 kHz, from 50 kHz to 100 kHz, from 100 kHz to 500 kHz, from 500 kHz to 1 GHz, from 1 GHz to 2 GHz, from 2 GHz to 3 GHz, from 3 GHz to 4 GHz, from 4 GHz to 5 GHz, from 5 GHz to 10 GHz, from 10 GHz to 50 GHz, from 50 GHz to 100 GHz, from 100 GHz to 300 GHz. In preferred embodiments, the electrical signals are in a frequency range of from about 1 GHz to about 10 GHz.

Typically, antennas operating in these and other frequency ranges are operably coupled to one or both of a radio transmitter or a radio receiver by at least one transmission line, and such embodiments are considered within the present disclosure. In other embodiments, the receiver is further operably coupled to an amplifier.

The antennas of the present disclosure may be configured in any form normally contemplated for antennas operating in the radio frequency range. In independent embodiments, the antenna can be configured as a monopole antenna, a dipole antenna, or as part of an array comprising one or both of these configurations.

Whereas the antenna has been described as comprising a MXene composition, that MXene composition may be present as the entire antenna, as a coating of the antenna, or of any part of the antenna. Where the MXene material is present as a coating on a conductive or non-conductive substrate, that MXene coating may cover some or all of the underlying substrate material. Such substrates may be virtually any conducting or non-conducting material, though preferably the MXene coating is positioned adjacent to a non-conductive surface. Such non-conductive surfaces or bodies may comprise virtually any non-electrically conducting organic polymer, inorganic material (e.g., glass or silicon), or synthetic and natural fiber (including fabric) substrates. Since MXene can be produced as a free-standing film, or applied to any shaped surface, in principle the MXene can be applied to almost any substrate material, depending on the intended application, with little dependence on morphology and roughness. In independent embodiments, the substrate may be a non-porous, porous, microporous, or aerogel form of an organic polymer, for example, a fluorinated or perfluorinated polymer (e.g., PVDF, PTFE) or an alginate polymer, a silicate glass, silicon, GaAs, or other low-K dielectric, an inorganic carbide (e.g., SiC) or nitride ($Al_3N_4$) or other thermally conductive inorganic material wherein the choice of substrate depends on the intended application. Depending on the nature of the application, low-k dielectrics or high thermal conductivity substrates may be used. While the nature of MXene coatings is not necessarily sensitive to surface roughness, speed and losses may be affected by the nature of the substrate, especially in the GHz range.

As with material, the form of the substrate is not necessarily limiting to the antennas used. In some embodiments, the substrate is rigid (e.g., on a silicon wafer). In other embodiments, substrate is flexible (e.g., on a flexible polymer sheet). Substrate surfaces may be organic, inorganic, or metallic, and comprise metals (Ag, Au, Cu, Pd, Pt) or metalloids; conductive or non-conductive metal oxides (e.g., $SiO_2$, ITO), nitrides, or carbides; semi-conductors (e.g., Si, GaAs, InP): glasses, including silica or boron-based glasses; or organic polymers.

The coating may be patterned or unpatterned on the substrate. In independent embodiments, the coatings may be applied or result from the application by spin coating, dip coating, roller coating, compression molding, doctor blading, ink printing, painting or other such methods. Multiple coatings of the same or different MXene compositions may be employed.

Flat surface or surface-patterned substrates can be used. The MXene coatings may also be applied to surfaces having patterned metallic conductors or wires. Additionally, by combining these techniques, it is possible to develop patterned MXene layers by applying a MXene coating to a photoresist layer, either a positive or negative photoresist, photopolymerize the photoresist layer, and develop the photopolymerized photoresist layer. During the developing stage, the portion of the MXene coating adhered to the removable portion of the developed photoresist is removed. Alternatively, or additionally, the MXene coating may be applied first, followed by application, processing, and development of a photoresist layer. By selectively converting the exposed portion of the MXene layer to an oxide using nitric acid, a MXene pattern may be developed. In short, these MXene materials may be used in conjunction with any appropriate series of processing steps associated with thick or thin film processing to produce any of the structures or devices described herein (including, e.g., plasmonic nanostructures).

The methods described in PCT/US2015/051588 (filed Sep. 23, 2015), incorporated by reference herein at least for such teachings, are suitable for such applications.

These MXene coatings may be applied or be present on a substrate wherein the MXene coating comprises a binder. Again, while not necessarily limiting, such binders are preferably an organic polymer or glass binder, for example any organic polymer, but in some applications is preferably a fluorinated or perfluorinated (e.g., PVDF, PTFE), silicate glass, or alginate polymers. In certain high frequency applications, the binder has dielectric permittivity of less than 5, preferably less than 4, 3.5, 3, 2.5, or 2 at 1 GHz.

In other embodiments, the MXene coatings may be applied or be present on a substrate wherein the MXene coating is binder-free. Such coatings may be applied by any of the methods described above and in PCT/US2015/051588 (filed Sep. 23, 2015). In some embodiment, the binder-free MXene coatings can be laminated and/or coated, for example, with alginate or other organic polymers to make them more durable.

In independent embodiment in the context of these antennas, the MXene coating can be present and is operable, in virtually any thickness, from the nanometer scale to hundreds of microns. Within this range, in some embodiments, the MXene may be present at a thickness ranging from 1 nm to 1000 microns, or in a range defined by one or more of the ranges of from 1 nm to 5 nm, from 5 nm to 10 nm, from 10 nm to 15 nm, from 15 nm to 20 nm, from 20 nm to 25 nm, from 25 nm to 50 nm, from 50 nm to 100 nm, from 100 nm to 150 nm, from 150 nm to 200 nm, from 200 nm to 250 nm, from 250 nm to 500 nm, from 500 nm to 1000 nm, from 1000 nm to 1500 nm, from 1500 nm to 2500 nm, from 2500 nm to 5000 nm, from 5 μm to 100 μm, from 100 μm to 500 μm, or from 500 μm to 1000 μm, when additional mechanical robustness of the antenna is required.

Typically, in such coatings, the MXene is present as an overlapping array of two or more overlapping layers of MXene platelets oriented to be essentially coplanar with the substrate surface. In specific embodiments, the MXene platelets have at least one mean lateral dimension in a range of from about 0.1 micron to about 50 microns, or in a range defined by one or more of the ranges of from 0.1 to 2 microns, from 2 microns to 4 microns, from 4 microns to 6 microns, from 6 microns to 8 microns, from 8 microns to 10 microns, from 10 microns to 20 microns, from 20 microns to 30 microns, from 30 microns to 40 microns, or from 40 microns to 50 microns.

Again, the antenna may also be present such that its body is a molded or formed body comprising the MXene composition. While such compositions may comprise any of the MXene compositions described herein, exemplary methods of making such structures are described in PCT/US2015/051588 (filed Sep. 23, 2015), which is incorporated by reference herein at least for such teachings.

In still further embodiments, the disclosed antennas may further be coated or encapsulated by an organic polymer or glass coating. Such coatings serve to protect the antennas from physical abuse and environmental elements, and so potentially any polymer composition suitable for this purpose can be used. In certain embodiments, organic polymers such as acrylates, methacrylates, polyvinyl alcohol, epoxies, or polyurethanes and silicate or borosilicate glasses may be used.

These inventive antennas may also be described functionally, in the context of the described compositions. While specific values may depend on the composition and thickness of the MXene compositions described herein, in certain embodiments, the MXene-containing antenna may be characterized as exhibiting a peak return loss of greater than 40, 41, 42, 43, 44, or 45 dB when tested according to the methods described herein. Likewise, the MXene-containing antenna may characterized as exhibiting a peak return loss of at least 95%, 96%, 97%, 98%, or 99% of that of a comparably configured copper antenna, when tested according to the methods described herein.

To this point, the invention(s) have been described in terms of the antennas themselves, the invention also contemplates that devices incorporating or comprising these antennas are also within the scope of the invention. Accordingly, devices such as radios (one way and/or two way radio), television sets, communication receivers, radar sets, cell phones, garage door openers, wireless microphones, Bluetooth- or other wireless enabled devices, wireless chargers (for batteries and supercapacitors), wireless computer networks, and even baby monitor, or RFID tags comprising any of the inventive antennas are considered within the scope of the present invention(s).

Likewise, any method of transmitting or receiving electromagnetic information using antennas, or apparatuses using such antennas, are within the scope of the present invention. For example, any method comprising applying an electric current oscillating at a radio frequency to any of the antenna described herein, such that the antenna radiates a radio wave is considered an independent embodiment of the present invention. Similarly, any method comprising receiving radio wave information by any of the antenna described herein, and converting the information to a useable audio signal, video signal, or digital data using a radio receiver is considered within the scope of the present invention.

Terms

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

When a list is presented, unless stated otherwise, it is to be understood that each individual element of that list, and every combination of that list, is a separate embodiment. For example, a list of embodiments presented as "A, B. or C" is to be interpreted as including the embodiments, "A," "B." "C," "A or B," "A or C," "B or C," or "A. B, or C."

The transitional terms "comprising," "consisting essentially of," and "consisting" are intended to connote their generally in accepted meanings in the patent vernacular; that is, (i) "comprising," which is synonymous with "including." "containing," or "characterized by." is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of." Where the term "consisting essentially of" is used, the basic and novel characteristic(s) of the method is intended to be the antennas which exhibit the properties described herein.

Throughout this specification, words are to be afforded their normal meaning, as would be understood by those skilled in the relevant art. However, so as to avoid misunderstanding, the meanings of certain terms will be specifically defined or clarified.

While MXene compositions include any and all of the compositions described in the patent applications and issued patents described above, in some embodiments, MXenes are materials comprising or consisting essentially of a $M_{n+1}X_n(T_s)$ composition having at least one layer, each layer having a first and second surface, each layer comprising
a substantially two-dimensional array of crystal cells.
each crystal cell having an empirical formula of $M_{n+1}X_n$, such that each X is positioned within an octahedral array of M,
wherein M is at least one Group 3, 4, 5, 6, or 7,
wherein each X is carbon and nitrogen or combination of both and n=1, 2, or 3;
wherein at least one of said surfaces of the layers has surface terminations, $T_s$, independently comprising alkoxide, alkyl, carboxylate, halide, hydroxide, hydride, oxide, sub-oxide, nitride, sub-nitride, sulfide, sulfonate, thiol, or a combination thereof;

As described elsewhere within this disclosure, the $M_{n+1}X_n(T_s)$ materials produced in these methods and compositions have at least one layer, and sometimes a plurality of layers, each layer having a first and second surface, each layer comprising a substantially two-dimensional array of crystal cells: each crystal cell having an empirical formula of $M_{n+1}X_n$, such that each X is positioned within an octahedral array of M, wherein M is at least one Group 3, 4, 5, 6, or 7 metal (corresponding to Group IIIB, IVB, VB, VIB or VIIB metal), wherein each X is C and/or N and n=1, 2, or 3; wherein at least one of said surfaces of the layers has surface terminations, $T_s$, comprising alkoxide, alkyl, carboxylate, halide, hydroxide, hydride, oxide, sub-oxide, nitride, sub-nitride, sulfide, sulfonate, thiol, or a combination thereof.

Supplementing the descriptions above, $M_{n+1}X_n(T_s)$, compositions may be viewed as comprising free standing and stacked assemblies of two dimensional crystalline solids. Collectively, such compositions are referred to herein as "$M_{n+1}X_n(T_s)$," "MXene." "MXene compositions," or "MXene materials." Additionally, these terms "$M_{n+1}X_n(T_s)$," "MXene," "MXene compositions." or "MXene materials" also refer to those compositions derived by the chemical exfoliation of MAX phase materials, whether these compositions are present as free-standing 2-dimensional or stacked assemblies (as described further below). Reference to the carbide equivalent to these terms reflects the fact that X is carbon, C, in the lattice. Such compositions comprise at least one layer having first and second surfaces, each layer comprising: a substantially two-dimensional array of crystal cells; each crystal cell having an empirical formula of $M_{n+1}X_n$, where M, X, and n are defined above. These compositions may be comprised of individual or a plurality of such layers. In some embodiments, the $M_{n+1}X_n(T_s)$ MXenes comprising stacked assemblies may be capable of, or have atoms, ions, or molecules, that are intercalated between at least some of the layers. In other embodiments, these atoms or ions are lithium. In still other embodiments, these structures are part of an energy-storing device, such as a battery or supercapacitor. In still other embodiments these structures are added to polymers to make polymer composites.

The term "crystalline compositions comprising at least one layer having first and second surfaces, each layer comprising a substantially two-dimensional array of crystal cells" refers to the unique character of these materials. For purposes of visualization, the two-dimensional array of crystal cells may be viewed as an array of cells extending in an x-y plane, with the z-axis defining the thickness of the composition, without any restrictions as to the absolute orientation of that plane or axes. It is preferred that the at least one layer having first and second surfaces contain but a single two-dimensional array of crystal cells (that is, the z-dimension is defined by the dimension of approximately one crystal cell), such that the planar surfaces of said cell array defines the surface of the layer; it should be appreciated that real compositions may contain portions having more than single crystal cell thicknesses.

That is, as used herein. "a substantially two-dimensional array of crystal cells" refers to an array which preferably includes a lateral (in x-y dimension) array of crystals having a thickness of a single cell, such that the top and bottom surfaces of the array are available for chemical modification.

Metals of Group 3, 4, 5, 6, or 7 (corresponding to Group IIIB, IVB, VB, VIB, or VIIB), either alone or in combination, said members including Ti, Zr, Hf, V, Nb, Ta, Cr, Mo, and W. For the purposes of this disclosure, the terms "M" or "M atoms," "M elements," or "M metals" may also include Mn. Also, for purposes of this disclosure, compositions where M comprises Ti, Zr, Hf, V, Nb, Ta, Cr, Mo, W, or mixtures thereof constitute independent embodiments. Similarly, the oxides of M may comprise any one or more of these materials as separate embodiments. For example, M may comprise any one or combination of Hf, Cr, Mn, Mo, Nb, Sc, Ta, Ti, V, W, or Zr. In other preferred embodiments, the transition metal is one or more of Ti, Zr, V, Cr, Mo, Nb, Ta, or a combination thereof. In even more preferred embodiments, the transition metal is Ti, Ta, Mo, Nb, V, Cr, or a combination thereof.

In certain specific embodiments, $M_{n+1}X_n$ comprises $M_{n+1}C_n$ (i.e., where X=C, carbon) which may be $Ti_2C$, $V_2C$, $V_2N$, $Cr_2C$, $Zr_2C$, $Nb_2C$, $Hf_2C$, $Ta_2C$, $Mo_2C$, $Ti_3C_2$, $V_3C_2$, $Ta_3C_2$, $Mo_3C_2$, $(Cr_{2/3}Ti_{1/2})_3C_2$, $Ti_4C_3$, $V_4C_3$, $Ta_4C_3$, $Nb_4C_3$, or a combination thereof.

In more specific embodiments, the $M_{n+1}X_n(T_s)$ crystal cells have an empirical formula $Ti_3C_2$ or $Ti_2C$. In certain of these embodiments, at least one of said surfaces of each layer of these two dimensional crystal cells is coated with surface terminations, $T_s$, comprising alkoxide, fluoride, hydroxide, oxide, sub-oxide, sulfonate, or a combination thereof.

The range of compositions available can be seen as extending even further when one considers that each M-atom position within the overall $M_{n+1}X_n$ matrix can be represented by more than one element. That is, one or more type of M-atom can occupy each M-position within the respective matrices. In certain exemplary non-limiting examples, these can be $(M^A_xM^B_y)_2C$, $(M^A_xM^B_y)_3C_2$, or $(M^A_xM^B_y)_4C_3$, where $M^A$ and $M^B$ are independently members of the same group, and x+y=1. For example, in but one non-limiting example, such a composition can be $(V_{1/2}Cr_{1/2})_3C_2$.

In other embodiments, the MXenes may comprise compositions having at least two Group 4, 5, 6, or 7 metals, and the $M_{n+1}X_n(T_s)$ composition is represented by a formula $M'_2M''_mX_{m+1}(T_s)$, where m=n-1. Typically, these are carbides (i.e., X is carbon). Such compositions are described in U.S. Patent Application No. 62/149,890, this reference being incorporated herein by reference for all purposes. In these double transition metal carbides, M' may be Ti, V, Cr, or Mo. In these ordered double transition metal carbides, M" may be Ti, V, Nb, or Ta, provided that M' is different than M". These carbides may be ordered or disordered.

Individual embodiments of the ordered double transition metal carbides include those compositions where $M'_2M''_mX_{m+1}$, is independently $Mo_2TiC_2$, $Mo_2VC_2$, $Mo_2TaC_2$, $Mo_2NbC_2$, $Mo_2Ti_2C_3$, $Cr_2TiC_2$, $Cr_2VC_2$, $Cr_2TaC_2$, $Cr_2NbC_2$, $Ti_2NbC_2$, $Ti_2TaC_2$, $V_2TaC_2$, $V_2TiC_2$, or a combination thereof. In some other embodiments, $M'_2M''_mX_{m+1}$, is independently $Mo_2TiC_2$, $Mo_2VC_2$, $Mo_2TaC_2$, $Mo_2NbC_2$, $Cr_2VC_2$, $Cr_2TaC_2$, $Cr_2NbC_2$, $Ti_2NbC_2$, $Ti_2TaC_2$, $V_2TaC_2$, $V_2TiC_2$, or a combination thereof. In other embodiments, $M'_2M''_mX_{m+1}$, is independently $Mo_2Ti_2C_3$, $Mo_2V_2C_3$, $Mo_2Nb_2C_3$, $Mo_2Ta_2C_3$, $Cr_2Ti_2C_3$, $Cr_2V_2C_3$, $Cr_2Nb_2C_3$, $Cr_2Ta_2C_3$, $Nb_2Ta_2C_3$, $Ti_2Nb_2C_3$, $Ti_2Ta_2C_3$, $V_2Ta_2C_3$, $V_2Nb_2C_3$, $V_2Ti_2C_3$, or a combination thereof. In still other embodiments, $M'_2M'_mX_{m+1}$, is independently $Nb_2VC_2$, $Ta_2TiC_2$, $Ta_2VC_2$, $Nb_2TiC_2$ or a combination thereof.

In still other embodiments, the MXenes may comprise compositions prepared by etching the Group 13 and 14 elements of compositions having lattice cell stoichiometries of:

(a) $Cr_2Ga_2C$, $Cr_2Ga_2N$, $Mo_2Ga_2C$, $Mo_2Ga_2N$, $Nb_2Ga_2C$, $Nb_2Ga_2N$, $Ta_2Ga_2C$, $Ta_2Ga_2N$, $Ti_2Ga_2C$, $Ti_2Ga_2N$, $V_2Ga_2C$, or $V_2Ga_2N$;

(b) $Hf_2In_2C$, $Hf_2In_2N$, $Hf_2Sn_2C$, $Hf_2Sn_2N$, $Nb_2In_2C$, $Nb_2In_2N$, $Nb_2Sn_2C$, $Nb_2Sn_2N$, $Sc_2In_2C$, $Sc_2In_2N$, $Ti_2In_2C$, $Ti_2In_2N$, $Ti_2Sn_2C$, $Ti_2Sn_2N$, $Zr_2In_2C$, $Zr_2In_2N$, $Zr_2Sn_2C$, or $Zr_2Sn_2N$;

(c) $Mo_2TiC_2$, $Mo_2VC_2$, $Mo_2TaC_2$, $Mo_2NbC_2$, $Mo_2Ti_2C_3$, $Cr_2TiC_2$, $CT_2VC_2$, $Cr_2TaC_2$, $CrNbC_2$, $Ti_2NbC_2$, $Ti_2TaC_2$, $V_2TaC_2$, or $V_2TiC_2$;

(d) $Mo_2TiC_2$, $Mo_2VC_2$, $Mo_2TaC_2$, or $Mo_2NbC_2$;

(e) $Mo_2Ti_2C_3$, $Mo_2V_2C_3$, $Mo_2Nb_2C_3$, $Mo_2Ta_2C_3$, $Cr_2Ti_2C_3$, $Cr_2V_2C_3$, $Cr_2Nb_2C_3$, $Cr_2Ta_2C_3$, $Nb_2Ta_2C_3$. $Ti_2Nb_2C_3$, $Ti_2Ta_2C_3$. $V_2Ta_2C_3$, $V_2Nb_2C_3$, or $V_2Ti_2C_3$; or (f) $Mo_2Ti_2C_3$, $Mo_2V_2C_3$, $Mo_2Nb_2C_3$, $Mo_2Ta_2C_3$, $Ti_2Nb_2C_3$, $Ti_2Ta_2C_3$, or $V_2Ta_2C_3$.

Previously, these MXene materials, described above as either $M_{n+1}X_n(T_s)$ or $M'_2M''_mX_{m+1}$, may be prepared by selectively removing an A group element from a precursor MAX-phase material. Depending on the specific MAX being considered, these A group elements may be independently defined as including Al, As, Cd, Ga, Ge, P, Pb, In, S. Sn, or Tl. These same materials are contemplated as independent embodiments for the A element used in the present invention. Some of these A-group elements may be removed in aqueous media, for example, by a process comprising a treatment with a fluorine-containing acid. For example, Al, As, Ga, Ge, In, P. Pb, S, or Sn may be removed in this way, although Al is especially amenable to such extractions. Aqueous hydrofluoric acid is particularly suitable for this purpose, whether used as provided, or generated in situ by other conventional methods. Such methods include the use of any one or more of the following:

(a) aqueous ammonium hydrogen fluoride ($NH_4F.HF$);

(b) an alkali metal bifluoride salt (i.e., $QHF_2$, where Q is Li, Na, or K), or a combination thereof; or (c) at least one fluoride salt, such as an alkali metal, alkaline earth metal, or ammonium fluoride salt (e.g., LiF, NaF, KF, CsF, $CaF_2$, tetraalkyl ammonium fluoride (e.g., tetrabutyl ammonium fluoride)) in the presence of at least one mineral acid that is stronger than HF (i.e., has a higher Ka value) and can react with fluorides to form HF in situ (such as HCl, HBr, HI, $H_3PO_4$, $HNO_3$, oxalic acid, or $H_2SO_4$); or (d) a combination of two or more of (a)-(c), in some cases, the use of molten fluoride salts in inert atmosphere (Ar, $N_2$) may be used to remove the group 13 or 14 element (e.g., at 500-600° C., e.g., above the melting temperature of LiF, NaF, KFCsF, $CaF_2$ salts).

In specific embodiments, the fluorine-containing acid is derived from lithium fluoride and a strong aqueous mineral acid, such as HCl, $HNO_3$, or $H_2SO_4$, preferably HCl.

It also appears that the use of aqueous HF in the presence of one or more alkali halides, such as LiCl, provides advantages over using HF alone, or by reacting LiF with aqueous HCl. The use of LiF with aqueous HCl avoids the handling issues associated with the use of aqueous HF and provides higher yields of single-layer flakes, in some cases it may be difficult to remove LiF impurities and the removal of the A-element (e.g., Al) is slower. The use of LiCl with aqueous HF provides more crystalline MXene phases, with better control of the basal spacing (c parameter) and it is easier to vary the procedures especially for those involving ion intercalation.

As used herein, the terms "antenna" or "antennas" connote the definitions generally understood by those skilled in the art. An antenna or aerial is an electrical device which converts electric power into radio waves, and vice versa. It is usually used with a radio transmitter or radio receiver. Antennas (or antennae) are used in systems such as radio broadcasting, broadcast television, two-way radio, communications receivers, radar, cell phones, and satellite communications, as well as other devices such as garage door openers, wireless microphones, Bluetooth-enabled devices, wireless computer networks, baby monitors, and RFID tags on merchandise.

As used herein, the terms "dipole antenna" or "doublet" is also well understood by those skilled in the art as being the simplest and most widely used class of antenna in radio and telecommunications. Such an antenna consists of two identical conductive elements, which are usually bilaterally symmetrical. The most common form of dipole is two straight rods or wires oriented end to end on the same axis, with the feedline connected to the two adjacent ends. Dipoles are resonant antennas, meaning that the elements serve as resonators, with standing waves of radio current flowing back and forth between their ends and the length of the dipole elements is determined by the wavelength of the radio waves used. The most common form is the half-wave dipole, in which each of the two rod elements is approximately ¼ wavelength long, so the whole antenna is a half-wavelength long. Several different variations of the dipole are also used, such as the folded dipole, short dipole, cage dipole, bow-tie, and batwing antenna.

The following listing of Embodiments is intended to complement, rather than displace or supersede, the previous descriptions.

Embodiment 1. An antenna for transmitting and/or receiving electrical signals comprising a MXene composition. MXene composition are known but not in applications directed to antennas, and all such compositions are considered within the scope of this invention.

In certain Aspects of this Embodiment, wherein the MXene composition is any of the compositions described in at least one of U.S. patent application Ser. No. 14/094,966 (filed Dec. 3, 2013), 62/055,155 (filed Sep. 25, 2014), 62/214,380 (filed Sep. 4, 2015), 62/149,890 (filed Apr. 20, 2015), 62/127,907 (filed Mar. 4, 2015) or International Applications PCT/US2012/043273 (filed Jun. 20, 2012), PCT/US2013/072733 (filed Dec. 3, 2013), PCT/US2015/051588 (filed Sep. 23, 2015), PCT/US2016/020216 (filed Mar. 1, 2016), or PCT/US2016/028,354 (filed Apr. 20, 2016), preferably where the MXene composition comprises titanium and carbon (e.g., $Ti_3C_2$, $Ti_2C$, $Mo_2TiC_2$, etc.). Each of these compositions is considered independent Aspects of this Embodiment. Similarly, MXene carbides, nitrides, and carbonitrides are also considered independent Aspects of this Embodiment.

In certain specific Aspects, the MXene composition comprises:

(a) at least one layer having first and second surfaces, each layer described by a formula $M_{n+1}X_nT_x$ and comprising:

substantially two-dimensional array of crystal cells, each crystal cell having an empirical formula of $M_{n+1}X_n$, such that each X is positioned within an octahedral array of M, wherein M is at least one Group IIIB, IVB, VB, or VIB metal, wherein each X is C, N, or a combination thereof;

n=1, 2, or 3; and wherein $T_x$ represents surface termination groups; or (b) at least one layer having first and second surfaces, each layer comprising:

a substantially two-dimensional array of crystal cells, each crystal cell having an empirical formula of $M'_2M''_nX_{n+1}T_x$, such that each X is positioned within an octahedral array of M' and M'', and where $M''_n$ are present as individual two-dimensional array of atoms intercalated between a pair of two-dimensional arrays of M' atoms, wherein M' and M'' are different Group IIB, IVB, VB, or VIB metals (especially where M' and M'' are Ti, V, Nb, Ta, Cr, Mo, or a combination thereof), wherein each X is C, N, or a combination thereof;

n=1 or 2; and wherein $T_x$ represents surface termination groups.

Embodiment 2. The antenna of Embodiment 1, wherein at least one of said surfaces of each layer has surface termination groups ($T_x$) comprising alkoxide, carboxylate, halide, hydroxide, hydride, oxide, sub-oxide, nitride, sub-nitride, sulfide, thiol, or a combination thereof Embodiment 3. The antenna of Embodiment 1 or 2, wherein each M, M', and M'' is independently at least one Group IVB, Group VB, or Group VIB metal Embodiment 4. The antenna of any one of Embodiments 1 to 3, wherein M, M', and M'' is independently Cr, Ti, Mo, Nb, V, or Ta, or a combination thereof.

Embodiment 5. The antenna of any one of Embodiments 1 to 4, wherein the MXene composition is described by the formula $M_{n+1}X_n$.

Embodiment 6. The antenna of Embodiment 5, wherein $M_{n+1}X_n$ is $Ti_2C$, $V_2C$, $V_2N$, $Cr_2C$, $Zr_2C$, $Nb_2C$, $Hf_2C$, $Ta_2C$, $Mo_2C$, $Ti_3C_2$, $V_3C_2$, $Ta_3C_2$, $Mo_3C_2$, $(Cr_{2/3}Ti_{1/2})_3C_2$, $Ti_4C_3$, $V_4C_3$, $Ta_4C_3$, $Nb_4C_3$, or a combination thereof, preferably $Ti_2C$, $Mo_2TiC_2$, $Ti_3C_2$, or a combination thereof.

Embodiment 7. The antenna of any one of Embodiments 1 to 4, wherein the MXene composition is described by the formula $M'_2M''_nX_{n+1}T_x$.

Embodiment 8. The antenna of Embodiment 7, wherein n is 1, M' is Mo, and M'' is Nb, Ta, Ti, or V, or a combination thereof.

Embodiment 9. The antenna of Embodiment 7, wherein n is 2, M' is Mo, Ti, V, or a combination thereof, and M'' is Cr, Nb, Ta, Ti, or V, or a combination thereof.

Embodiment 10. The antenna of Embodiment 7, wherein $M'_2M''_nX_{n+1}$ comprises $Mo_2TiC_2$, $Mo_2VC_2$, $Mo_2TaC_2$, $Mo_2NbC_2$, $Mo_2Ti_2C_3$, $Cr_2TiC_2$, $Cr_2VC_2$, $Cr_2TaC_2$, $Cr_2NbC_2$, $Ti_2NbC_2$, $Ti_2TaC_2$, $V_2TaC_2$, $Mo_2Ti_2C_3$, $Mo_2V_2C_3$, $Mo_2Nb_2C_3$, $Mo_2Ta_2C_3$, $Cr_2Ti_2C_3$, $Cr_2V_2C_3$, $Cr_2Nb_2C_3$, $Cr_2Ta_2C_3$, $Nb_2Ta_2C_3$, $Ti_2Nb_2C_3$, $Ti_2Ta_2C_3$, $V_2Ta_2C_3$, $V_2Nb_2C_3$, or $V_2Ti_2C_3$, or a nitride or carbonitride analog thereof.

Embodiment 11. The antenna of any one of Embodiments 1 to 10, wherein the electrical signals are in a radio frequency range, wherein the radio frequency is considered to span the kilohertz to gigahertz frequency range.

Embodiment 12. The antenna of any one of Embodiments 1 to 10, wherein the electrical signals are in a frequency range of from about 3 kHz to about 300 GHz, including a frequency defined by one or more of the ranges of from 3 kHz to 5 kHz, from 5 kHz to 10 kHz, from 10 kHz to 50 kHz, from 50 kHz to 100 kHz, from 100 kHz to 500 kHz, from 500 kHz to 1 GHz, from 1 GHz to 2 GHz, from 2 GHz to 3 GHz, from 3 GHz to 4 GHz, from 4 GHz to 5 GHz, from 5 GHz to 10 GHz, from 10 GHz to 50 GHz, from 50 GHz to 100 GHz, from 100 GHz to 300 GHz.

Embodiment 13. The antenna of any one of Embodiments 1 to 12, wherein the electrical signals are in a frequency range of from about 1 GHz to about 10 GHz.

Embodiment 14. The antenna of any one of Embodiments 1 to 13, wherein the antenna is transmitting or receiving electrical signals in a range of from about 3 kHz to about 300 GHz, including a frequency defined by one or more of the ranges of from 3 kHz to 5 kHz, from 5 kHz to 10 kHz, from 10 kHz to 50 kHz, from 50 kHz to 100 kHz, from 100 kHz to 500 kHz, from 500 kHz to 1 GHz, from 1 GHz to 2 GHz, from 2 GHz to 3 GHz, from 3 GHz to 4 GHz, from 4 GHz to 5 GHz, from 5 GHz to 10 GHz, from 10 GHz to 50 GHz, from 50 GHz to 100 GHz, from 100 GHz to 300 GHz.

Embodiment 15. The antenna of any one of Embodiments 1 to 14, wherein the antenna is operably coupled to a radio transmitter or a radio receiver by at least one transmission line.

Embodiment 16. The antenna of Embodiment 15, wherein the receiver is further operably coupled to an amplifier.

Embodiment 17. The antenna of any one of Embodiments 1 to 16, wherein the antenna is a monopole antenna.

Embodiment 18. The antenna of any one of Embodiments 1 to 16, wherein the antenna is a dipole antenna.

Embodiment 19. The antenna of any one of claims 1 to 18, wherein the MXene composition comprises any composition described in U.S. patent application Ser. No. 14/094,966, filed Dec. 3, 2013, or its precursors.

Embodiment 20. The antenna of any one of Embodiments 1 to 18, wherein the MXene composition comprises any composition described in PCT/US2015/051588, filed Sep. 23, 2015, or its precursors.

Embodiment 21. The antenna of any one of Embodiments 1 to 18, wherein the MXene composition comprises any composition described in PCT/US2016/020216, filed Mar. 1, 2016, or its precursors.

Embodiment 22. The antenna of any one of Embodiments 1 to 18, wherein the MXene composition comprises any composition described in PCT/US2016/028354, filed Apr. 20, 2016, or its precursors.

Embodiment 23. The antenna of any one of Embodiments 1 to 22, wherein the MXene composition is present as a coating on a conductive or non-conductive substrate, preferably a non-conductive substrate including a substrate comprising organic polymer, inorganic (e.g., glass or silicon), or fabric (including synthetic and natural fiber) substrates. Since MXene can be produced as a free-standing film, in principle the antenna can be applied to almost any substrate material, depending on the intended application, with little dependence on morphology and roughness, though speed and losses may be affected by the nature of the substrate, especially in the GHz range. In independent Aspects of this Embodiment, the substrate may be a non-porous, porous, microporous, or aerogel form of an organic polymer, for example, a fluorinated or perfluorinated polymer (e.g., PVDF, PTFE) or an alginate polymer, a silicate glass, silicon, GaAs, or other low-K dielectric, an inorganic carbide (e.g., SiC) or nitride ($Al_3N_4$) or other thermally conductive inorganic material wherein the choice of substrate depends on the intended application.

Embodiment 24. The method of Embodiment 23, wherein the substrate is rigid.

Embodiment 25. The method of Embodiment 23, wherein the substrate is flexible.

Embodiment 26. The method of any one of Embodiments 23 to 25, wherein the coating is areal; i.e., coating an unpatterned area of the substrate.

Embodiment 27. The method of any one of Embodiments 23 to 25, wherein the coating is patterned on the substrate Embodiment 28. The antenna of any one of Embodiments 23 to 27, wherein the MXene coating comprises a binder, preferably an organic polymer or glass binder. In principle, the nature of the binder is not limiting, though in some Aspects of this Embodiment, the binders can be any organic polymer, but is preferably a fluorinated or perfluorinated (e.g., PVDF, PTFE), silicate glass, or alginate polymers. In other Aspects of this Embodiment, the binder has dielectric permittivity of less than 5, preferably less than 4, 3.5, 3, 2.5, or 2 at 1 GHz.

Embodiment 29. The antenna of any one of Embodiments 23 to 27, wherein the MXene coating is binder-free. In some Aspects of this Embodiment, the binder-free MXene coatings can be laminated and/or coated, for example, with alginate or other organic polymers to make them more durable.

Embodiment 30. The antenna of any one of Embodiments 23 to 29, wherein the MXene coating is present as a thickness in range of from 25 nm to 1000 microns, or in a range defined by one or more of the ranges of from 1 nm to 1000 microns, or in a range defined by one or more of the ranges of from 1 nm to 5 nm, from 5 nm to 10 nm, from 10 nm to 15 nm, from 15 nm to 20 nm, from 20 nm to 25 nm, from 25 nm to 50 nm, from 50 nm to 100 nm, from 100 nm to 150 nm, from 150 nm to 200 nm, from 200 nm to 250 nm, from 250 nm to 500 nm, from 500 nm to 1000 nm, from 1000 nm to 1500 nm, from 1500 nm to 2500 nm, from 2500 nm to 5000 nm, from 5 μm to 100 μm, from 100 μm to 500 μm, from 500 μm to 1000 μm, depending on the functioning or environmental stresses applied to the antenna when additional mechanical robustness of the antenna is required.

Embodiment 31. The antenna of any one of Embodiments 23 to 30, wherein the MXene is present in the coating as an overlapping array of two or more overlapping layers of MXene platelets oriented to be essentially coplanar with the substrate surface.

Embodiment 32. The antenna of Embodiment 31, wherein the MXene platelets have at least one mean lateral dimension in a range of from about 0.1 micron to about 50 microns, or in a range defined by one or more of the ranges of from 0.1 to 2 microns, from 2 microns to 4 microns, from 4 microns to 6 microns, from 6 microns to 8 microns, from 8 microns to 10 microns, from 10 microns to 20 microns, from 20 microns to 30 microns, from 30 microns to 40 microns, or from 40 microns to 50 microns.

Embodiment 33. The antenna of any one of Embodiments 1 to 22, wherein the antenna is a molded or formed body comprising the MXene composition.

Embodiment 34. The antenna of any one of Embodiments 1 to 33, wherein the MXene composition is covered by an organic polymer or glass coating. Again, potentially any polymer composition can be used, but protection from the environmental influence is desired. In certain Aspects of this Embodiment, polymers such as acrylates, methacrylates, polyvinyl alcohol, epoxies, or polyurethanes can be used, applied for example by spin coating, dip-coating, painting, or other such application.

Embodiment 35. A radio (one way and/or two way radio), a television, a communication receiver, a radar set, a cell phone, garage door opener, wireless microphone, Bluetooth-enabled device, wireless enabled device, wireless charger (for batteries and supercapacitors), wireless computer network, baby monitor, or RFID tag comprising the antenna of any one of Embodiments 1 to 34.

Embodiment 36. A method of transmitting electromagnetic information comprising applying an electric current oscillating at a radio frequency to the antenna of any one of Embodiments 1 to 34, such that the antenna radiates a radio wave.

Embodiment 37. A method comprising receiving radio wave information by the antenna of any one of Embodiments 1 to 34, and converting the information to a useable audio signal, video signal, or digital data using a radio receiver.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

Example 1. Experimental Details

Example 1.1. Antenna Fabrication

Example 1.1.1. MXene and Copper Film Dipoles

Figure 1B:
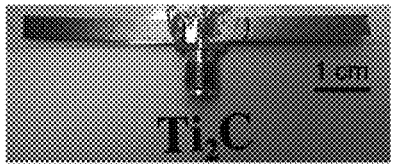
Figure 1C:
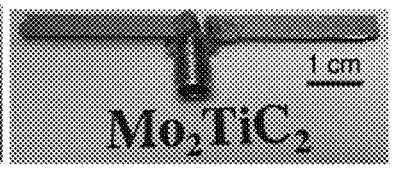
Figure 2:
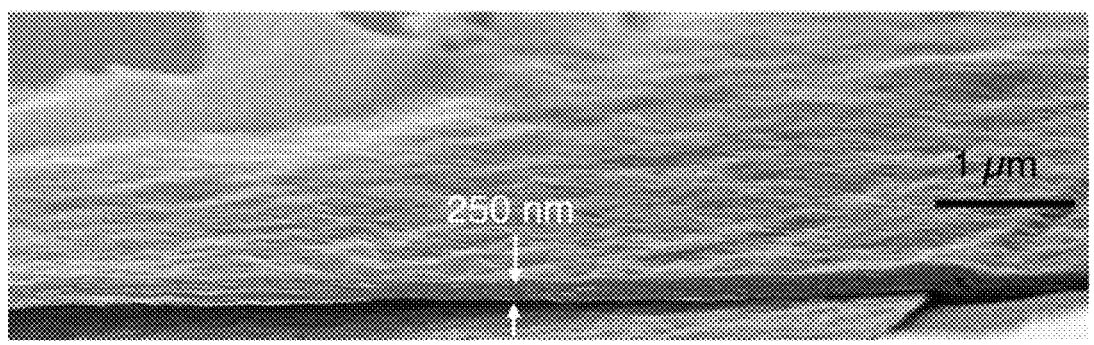
FIG. 2 shows a cross-sectional scanning electron micrograph of a spray-coated $Ti_3C_2$ on PET sheet with thickness of ~250 nm.

To create MXene antennas, $Ti_3C_2$, $Ti_2C$, $Mo_2TiC_2$ MXene films of were first cut into strips, 3 mm in width and 30 mm in length. Two strips were arranged with a 2.5 mm gap between them and attached to polyethylene terephthalate (PET transparency sheet) using a double-sided Scotch tape as an adhesive to form the arms of the dipole structure with an initial total length of 62.5 mm (FIGS. 1(A-C)). As a control, a copper film diploe was made following the same pattern (width and length). A gold-plated SubMiniature version A (SMA) connector was fixed to the PET substrate using conductive epoxy glue. The thicknesses of the all MXene films were about 5 μm and the copper film thickness was about 60 μm.

Example 1.1.2. $Ti_3C_2$ Spray-Coated Film Dipoles

Four similar $Ti_3C_2$ antennas (similar length and width) with different thicknesses were fabricated by spray coating $Ti_3C_2$ ink ($Ti_3C_2$ flakes colloidal solution in water). To do so, $Ti_3C_2$ antenna dipole pattern with arms of 3 mm wide×30 mm length were spray coated on a PET sheet, with four different thicknesses of ~70 nm, 150 nm, 250 nm and 500 nm. A gold-plated SubMiniature version A (SMA) connector was fixed to the PET substrate using conductive epoxy glue.

Example 2. Antenna Measurements

Figure 3:
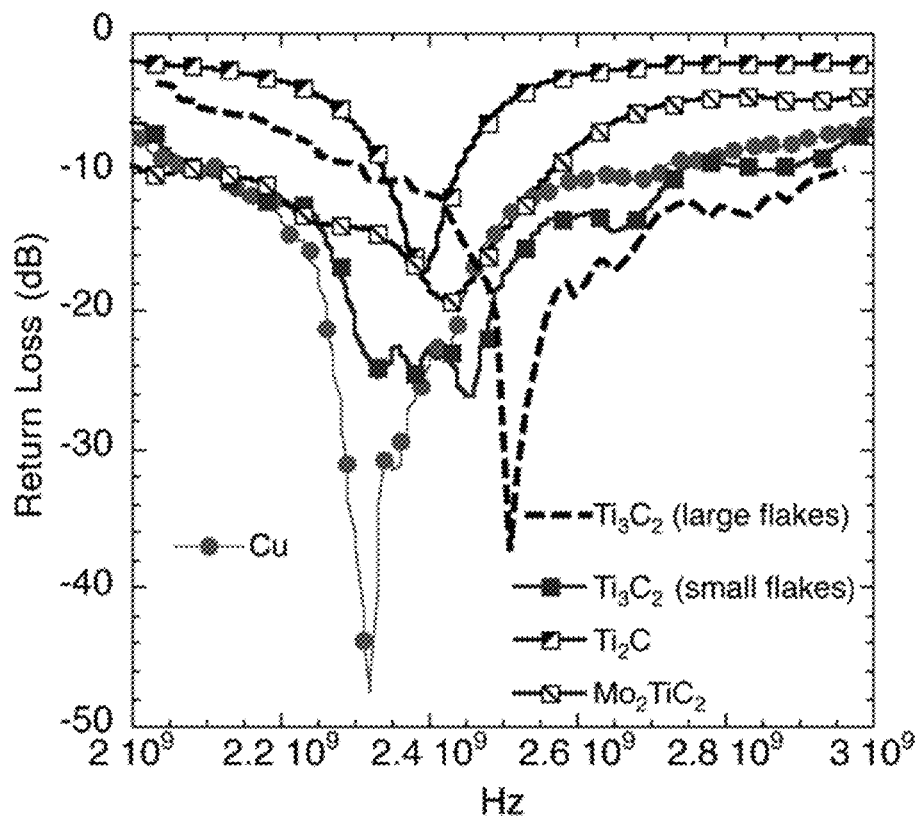
FIG. 3 shows return loss versus frequency of copper, large flakes $Ti_3C_2$, small flakes $Ti_3C_2$, $Mo_2TiC_2$ and $Ti_2C$ films.

The return loss ($S_{11}$) of the MXene film antennas was considered as the initial performance metric, illustrating the amount of power accepted by the antenna rather than reflected back to the source (FIG. 3). The return loss of the sample antennas was measured with an Agilent N5230A vector network analyzer. Copper film dipole exhibited a peak return loss of over 47 dB. The $Ti_3C_2$ MXene film dipole exhibited a peak return loss of over 45 dB. On a linear scale, a return loss of 45 dB equates to more than 99.99% of the incident signal not having returned to the source. $Ti_3C_2$ had a conductivity of about 4800 S/cm, which is about two orders of magnitude smaller than that of copper at 600,000 S/cm. $Ti_2C$ and $Mo_2TiC_2$ MXene film dipoles with a thickness of ~5 μm were also tested and they showed a return loss of 18 dB and 20 dB, respectively.

The MXene antennas outperformed the return loss of previously reported carbon nanomaterials such as graphene, onion-like carbon (OLC) and carbon nanotubes (CNT) film diploes. Both OLC and CNT had a return loss at or below 10 dB. See N. A. Vacirca, et al., Onion-like carbon and carbon nanotube film antennas. *Applied Physics Letters*, 103, 073301 (2013). Moreover, a compressed graphene laminate film dipole, which its conductivity was improved to ~430 S/cm by rolled compression, still exhibited a return loss of ~12 dB. See X. Huang, et al. Binder-free highly conductive graphene laminate for low cost printed radio frequency applications. *Applied Physics Letters* 106, 203105 (2015). In comparison, even $Mo_2TiC_2$ MXene at ~100 S/cm, which is the lowest conductivity among the tested MXenes, showed better return loss (20 dB).

Figure 4A:
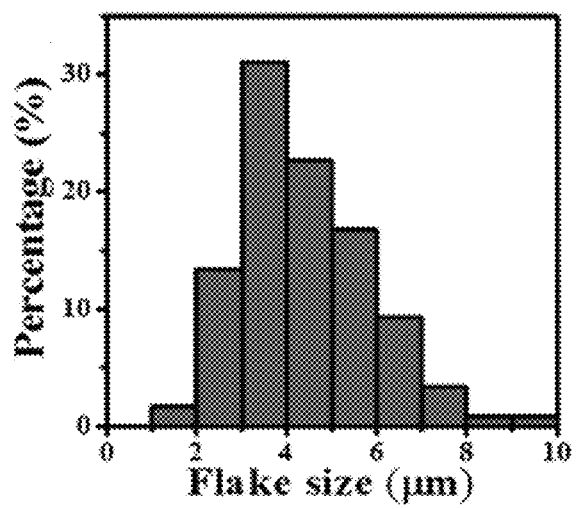
FIGS. 4(A-B) show flake size distribution of large flake $Ti_3C_2$ (FIG. 4A) and small flake $Ti_3C_2$ (FIG. 4B).
Figure 4B:
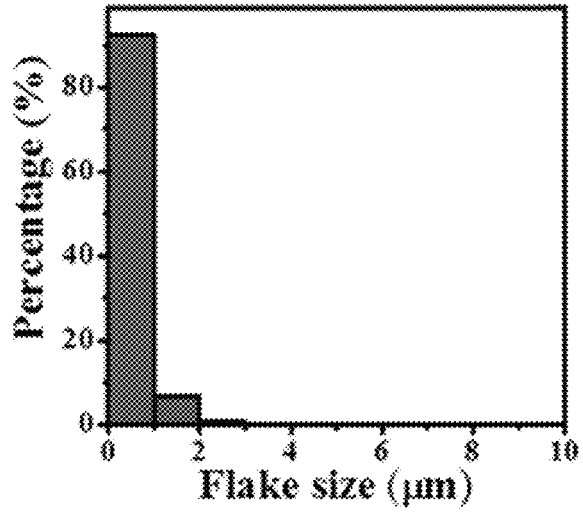

Moreover, $Ti_3C_2$ flake size can be controlled. $Ti_3C_2$ with flake size smaller than 1 μm (small flake $Ti_3C_2$) and larger flake size with average size of 3-6 μm (large flake $Ti_3C_2$) were fabricated as shown in FIG. 4A and FIG. 4B. The return loss of small flake $Ti_3C_2$ was measured to be 25 dB, which is still very high (>99% efficiency). Decreasing the efficiency can be due to the lower conductivity of the smaller $Ti_3C_2$ flakes film, which is around ~ 3000 S/cm. Return loss results also show that using smaller flake $Ti_3C_2$ can increase the bandwidth of the antenna (FIG. 3).

To maintain energy conservation, antenna power must either be radiated from the antenna or lost in another form, such as heat. Though a small amount of heat will be generated in any real, non-ideal system, a measurement of the antenna's radiation pattern can confirm that power is indeed radiating out from the antenna. This measurement is made by rotating the sample antenna about an axis and measuring the power received by a calibrated stationary receiver antenna. Reflections and outside interference are minimized by performing this procedure within an anechoic chamber.

Experimental measurements were performed in an anechoic chamber by aligning the substrate and dipole arms vertically normal to the receiver antenna and stepping the device through a full rotation in the elevation plane. Measurements sampled from this rotation represent a cross-section of the 3-dimensional toroidal radiation pattern. All experimental radiation measurements (FIGS. 5(A-F)) were made relative to the peak gain of a cylindrical reference dipole with a peak gain at 2.4 GHz of 2.5 dBi (FIGS.

Figure 5A:
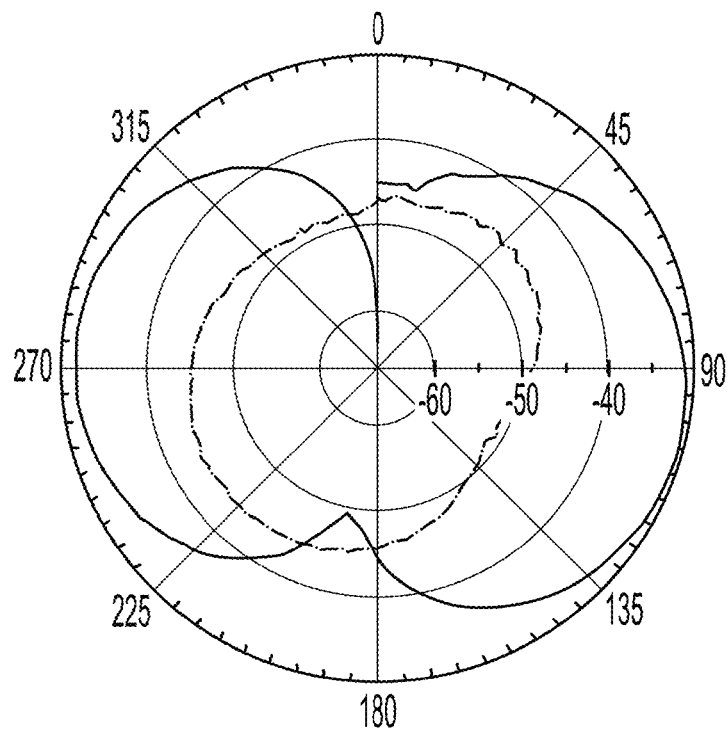
FIGS. 5(A-F) show measured radiation pattern of film dipole antenna of $Ti_3C_2$ film (FIG. 5A), copper film (FIG. 5B), and $Ti_3C_2$ spray-coated films with thicknesses of (c) 500 nm (FIG. 5C), 250 nm (FIG. 5D), 150 nm (FIG. 5E), and 70 nm (FIG. 5F).
Figure 5B:
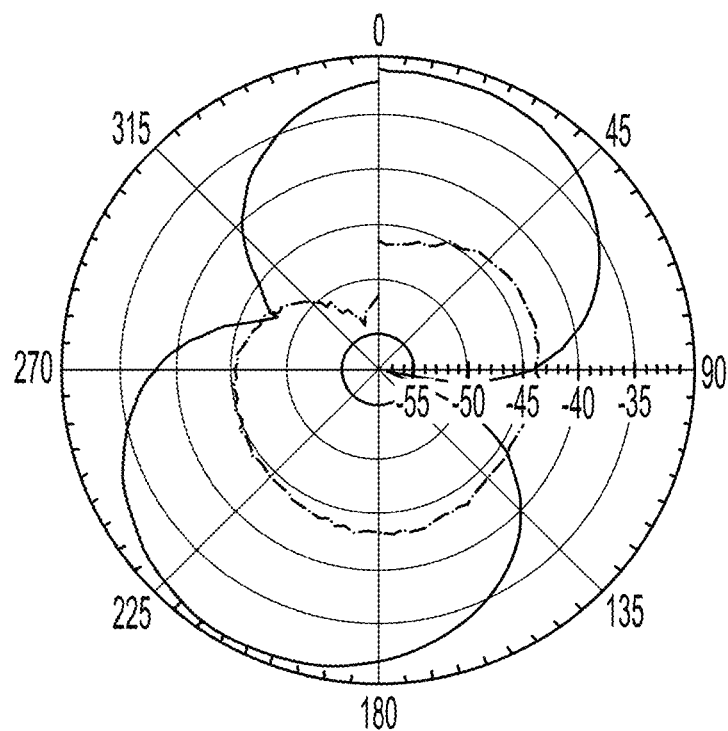
Figure 5C:
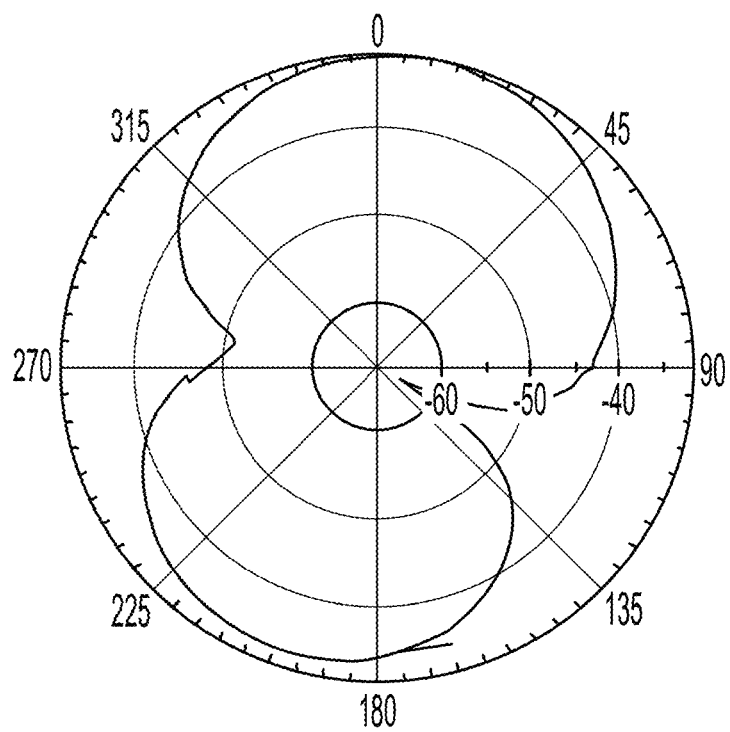
Figure 5D:
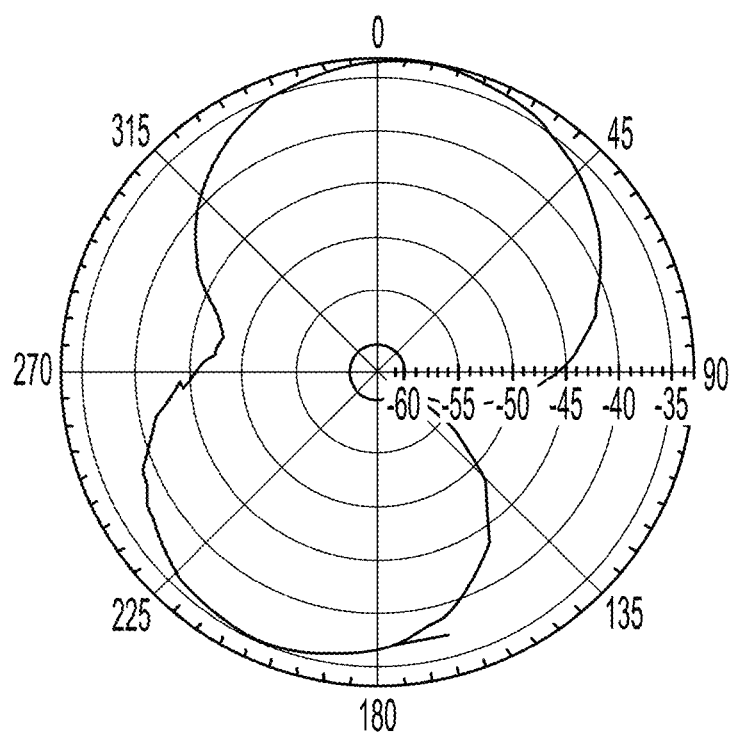
Figure 5E:
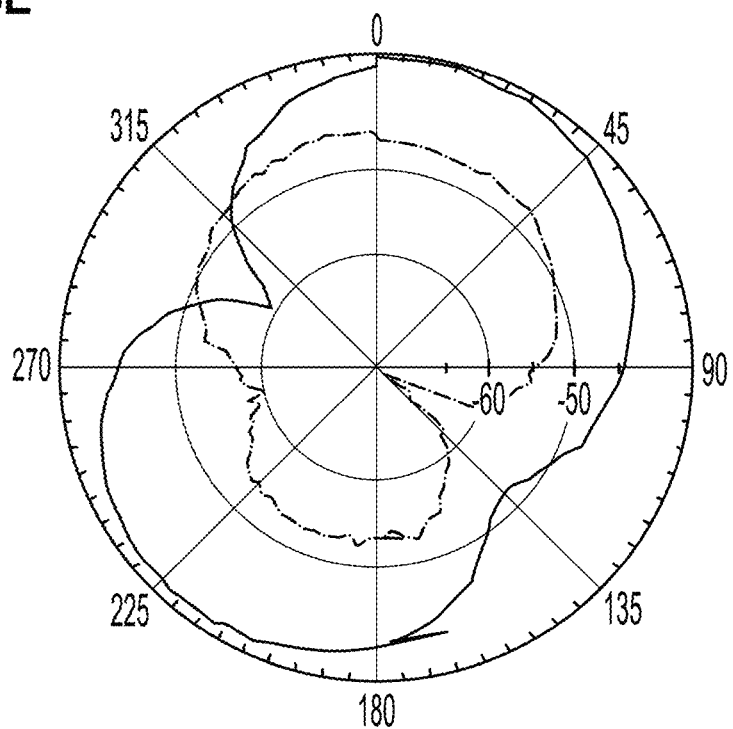
Figure 5F:
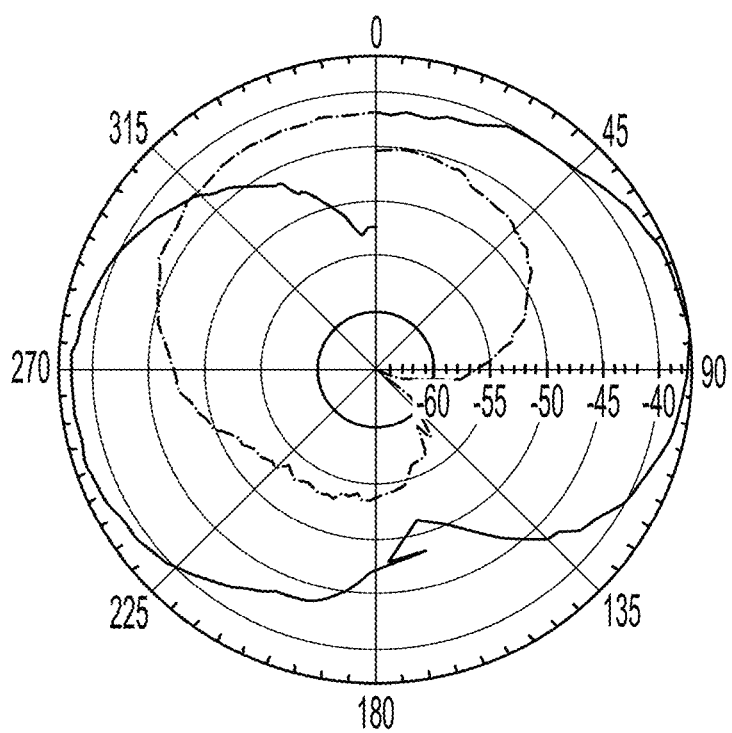

5(A-F)). The $Ti_3C_2$ film dipole (with a thickness of ~5 µm) exhibits a peak gain of 1.1 dBi (FIG. 5A), almost similar to that of the copper film dipole at 1.7 dBi (FIG. 5B).

To measure the required thickness for $Ti_3C_2$ to achieve a good peak gain, spray-coated $Ti_3C_2$ films with different thicknesses were tested. Peak gains of 0.1 dBi, −1.41 dBi, −4.97 dBi, and −5.2 dBi were measured for the 500, 250, 150 and 70 nm thickness films, respectively (FIGS. 5(C-F)).

Peak gain measured for $Ti_3C_2$ is among the highest measured for synthetic nanomaterials. For example, OLC and CNT film dipoles showed peak gains of −1.48 dBi and −2.76 dBi, respectively. Moreover, the peak gain of compressed graphene film with a thickness of 6 µm was also measured to be ~−0.6 to −1.0 dBi, which is less than that of the $Ti_3C_2$ film dipole with 500 nm thickness.

Example 3. Additional Comments

The following features are relevant to the disclosed invention(s):

This work demonstrated the fabrication of dipole antennas made from different MXene compositions of $Ti_3C_2$, $Ti_2C$, $Mo_2TiC_2$ as exemplars of the general MXene family.

The films exemplified here were binder free and fabricated simply from the MXene colloidal solutions in water (MXene ink). Since MXenes can be made in colloidal aqueous and non-aqueous (e.g., organic solvent) solutions, they can be used as ink to print, spray paint, etc. any shape, design and thickness to fabricate very thin, flexible and transparent antennas in one simple step.

Any kind of antenna fabrication method can be employed, for example printing, spraying, coating, painting, rolling MXene clay into films, cutting complicated shapes for different antenna designs.

MXene return loss and peak gain outperformed any synthetic materials. Although MXenes are theoretically not as conductive as copper, the present work showed that MXene outperforms copper, the mostly used and very well-known antenna material. The as synthesized binder free titanium carbide ($Ti_3C_2$) MXene film dipole antenna showed a return loss of about 50 dB. The MXene antenna's radiation pattern measurements showed a peak gain similar to the copper dipole antenna. Such a high antenna performance has never been reported for any nanomaterials.

With the variety of MXene composition, it was and will be possible to tune the antenna for different applications.

By controlling the flake size, the bandwidth of the antenna can further be controlled.

Fabricating MXene-polymer composites can protect MXene from oxidation and can further improve its flexibility. In order to make MXenes films mechanically more robust, 2D MXene flakes can be embedded in polymer matrices. Moreover, using a polymer as a matrix can further improve the oxidation resistance of MXenes.

Example 4

A variety of antennae comprising MXene materials have been tested to transmit and receive RF signal in a wide frequency range. Two exemplary configurations include dipole antennas (FIG. 6A) and transmission lines (FIG. 6B).

Figure 6A:
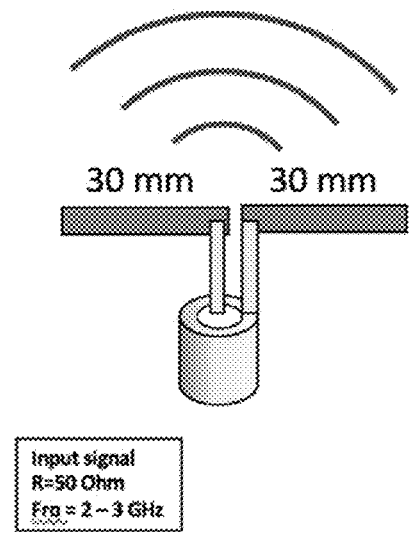
FIG. 6A shows dipole antenna configuration and FIG. 6B shows transmission line configuration.
Figure 7A:
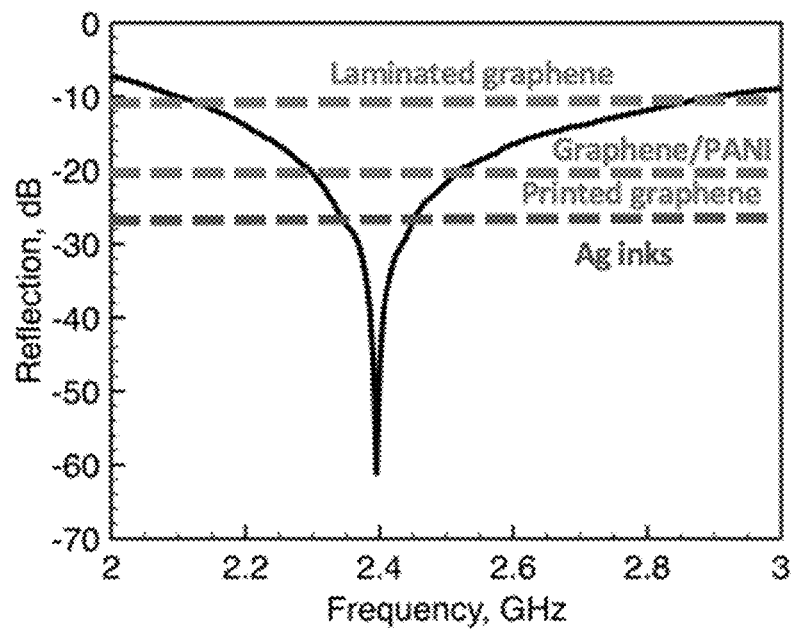
FIG. 7A shows the reflection coefficient of 12-µm thick $Ti_3C_2$ MXene dipole antenna compared with printed antennas of other materials reported previously.
Figure 7B:
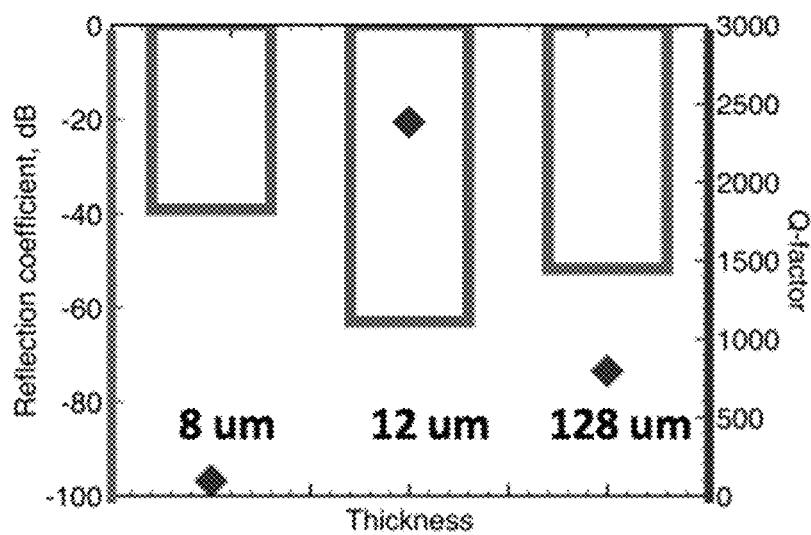
FIG. 7B compares the reflection coefficient (green bars) and Q-factor (red diamonds) of MXene dipole antennas of various thicknesses.

In the former configurations, dipole antennas were prepared with filtered $Ti_3C_2$ film of various thicknesses. The optimal dimensions are shown in FIG. 6A. Two stripes of dipole antenna were connected with conductive silver epoxy to the connector SMA-SJEDM-11BS00. Dipole antennas were analyzed with Agilent VNA with input impedance 50 Ohm. With these antennae, it was possible to achieve reflection coefficients of about −65 dB which makes MXene dipole antennas more efficient than the printed graphene, laminated graphene, graphene/PANI or silver ink printed. The highest reflection was obtained with a 12-µm $Ti_3C_2$ film. The Q factor for this device which represent the quality of antenna was 2500. Two different dipole antennas were also prepared with different thicknesses of 8 µm and 128 µm and their performances were compared to the 12-µm thick film dipole antenna. While antennae having MXene thicknesses ranging from 8 µm to 128 µm were found to show good performance, the antenna having a thickness of 12-µm was found to be the optimum required thickness for MXene antennas (FIG. 7B).

Figure 6B:
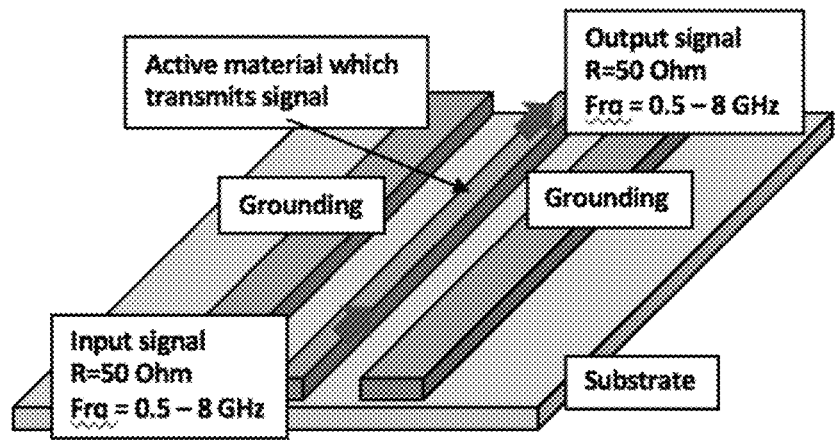
Figure 6B:
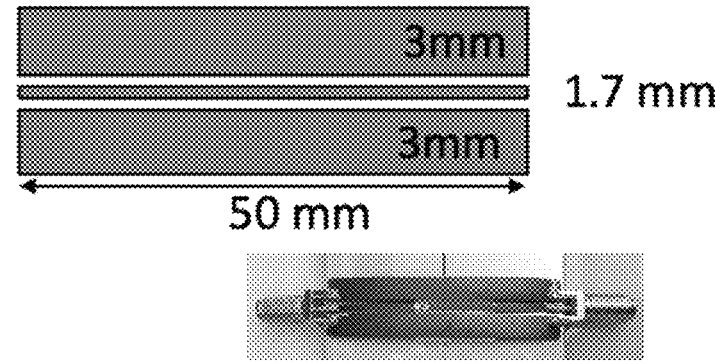
Figure 8A:
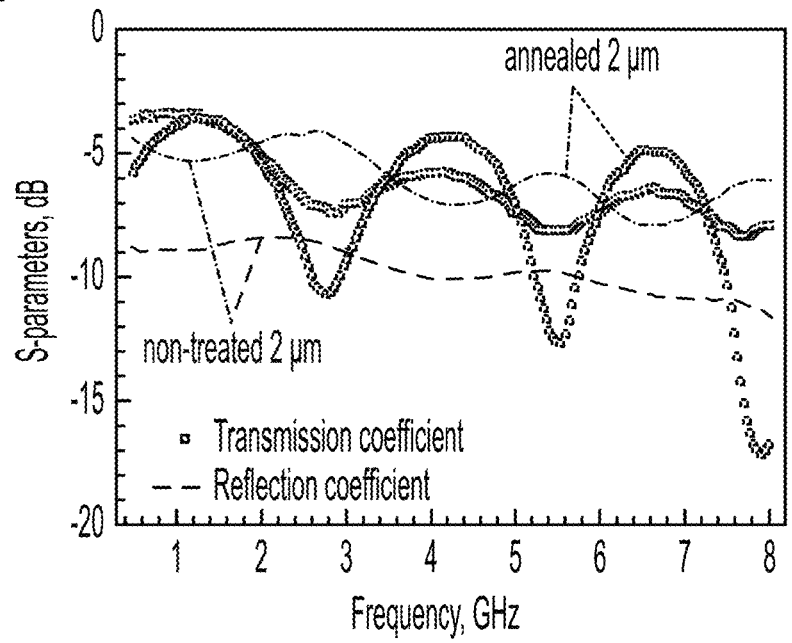
FIGS. 8(A-F) show S parameters and attenuation of MXene transmission lines: sprayed MXene on PET (FIGS. 8A-B); rolled MXene (FIGS. 8C-D); and sprayed MXene on paper (FIGS. 8 E-F).
Figure 8B:
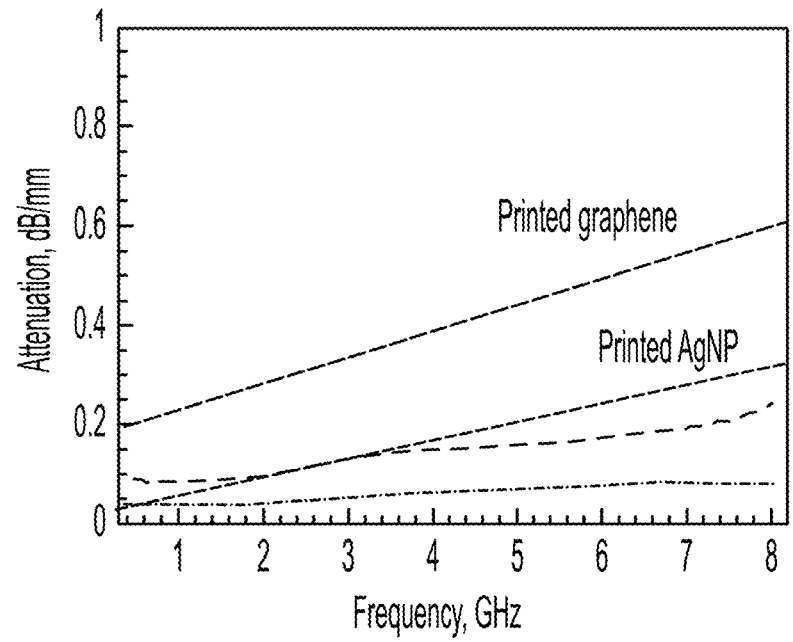
Figure 8C:
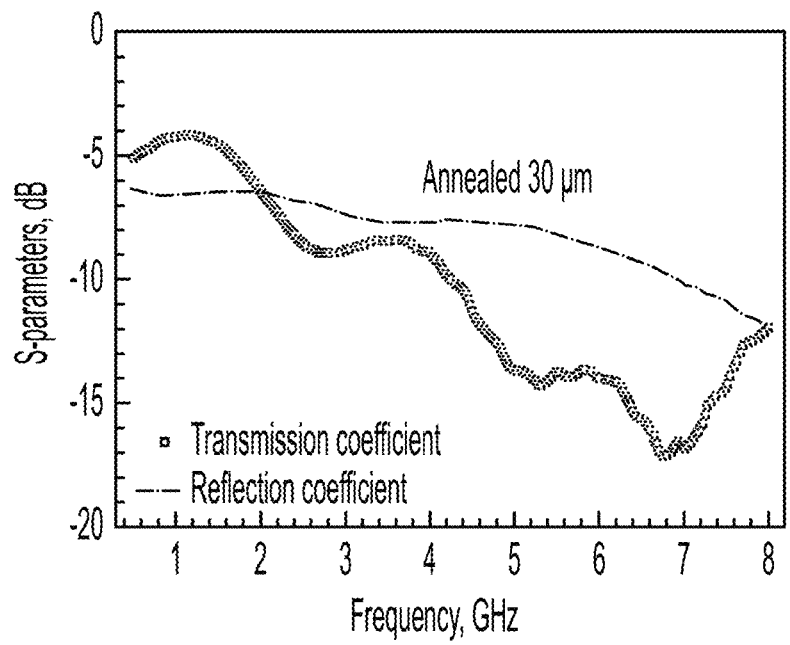
Figure 8D:
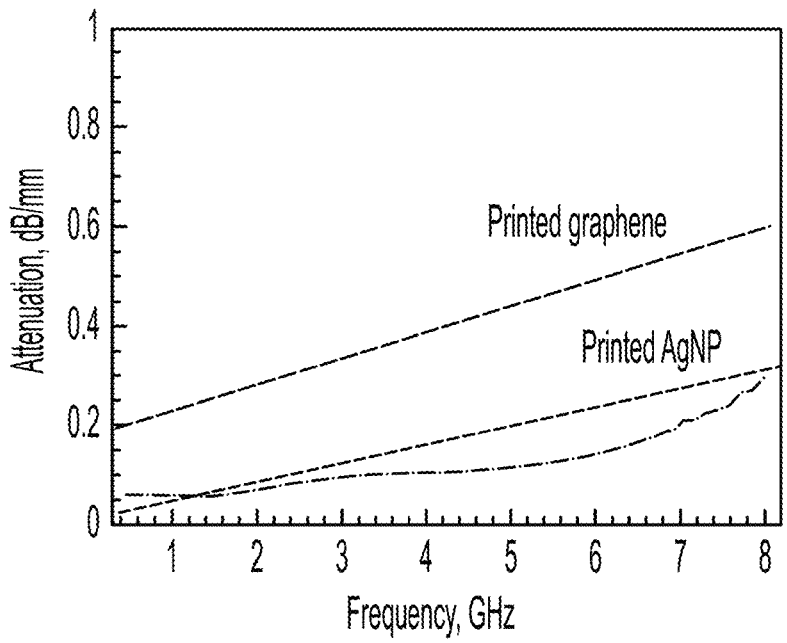

To show how MXene can transmit radio frequency signal, $Ti_3C_2$ transmission lines (TLs) were prepared as shown in FIG. 6B. Transmission lines are basic devices designed to carry signal through the material and essential for signal transmission, impedance matching network, resonators, filters etc. The stripe in the middle conducts the signal whereas other two stripes represent the grounding (FIG. 6B). The main characteristics of TLs are transmission coefficient, or $S_{21}$ parameter, and attenuation. The measurements were done with 2 port Agilent VNA in the range between 0.5 GHz to 8 GHz. Attenuation was calculated using equation:

$$\text{Attenuation} = \frac{1 - |S11|^2}{|S21|^2}$$

where $S_{21}$ and $S_{11}$ parameters (S-parameters) represent transmission and reflection coefficients, respectively. Calculated attenuation is also known as insertion loss. MXene TLs were prepared by spraying MXene water based ink containing $Ti_3C_2$ flakes on a PET sheet with a thickness of 0.12 mm and dielectric constant of 3.4. The thickness of the sprayed MXene film was measured by scanning electron microscopy (SEM) to be 2 µm. The smooth surface of PET allowed for the production of well aligned film with bulk conductivity in the range of 5000 S/cm. FIG. 8A shows reflection and transmission coefficients of the sprayed $Ti_3C_2$ MXene on PET. The film was annealed in vacuum for 24 hours at 200° C. The attenuation was calculated using MATLAB from the measured coefficients. FIG. 8B showed MXene attenuation was almost constant throughout the entire frequency range tested, up to 8 GHz. This indicated that MXene attenuation, unlike graphene or silver ink, is frequency independent which opens a wide range of applications for MXenes as antenna. Sprayed $Ti_3C_2$ on PET substrate showed less losses that printed graphene or silver ink which makes it more attractive for RF systems (FIG. 8B). Thicker MXene films were also tested as TLs. To do so, $Ti_3C_2$ MXene clay powder was rolled into a film and placed on paper substrate and vacuum dried at 150° C. for 5 hours. The thickness of the rolled clay film was 30 µm, which was 10 times thicker than the sprayed one. The performance of the thicker film is comparable with the thin sprayed sample (FIGS. 8C-D), which proved that the thickness of the skin depth was not a limitation factor for MXene antennas.

Figure 8E:
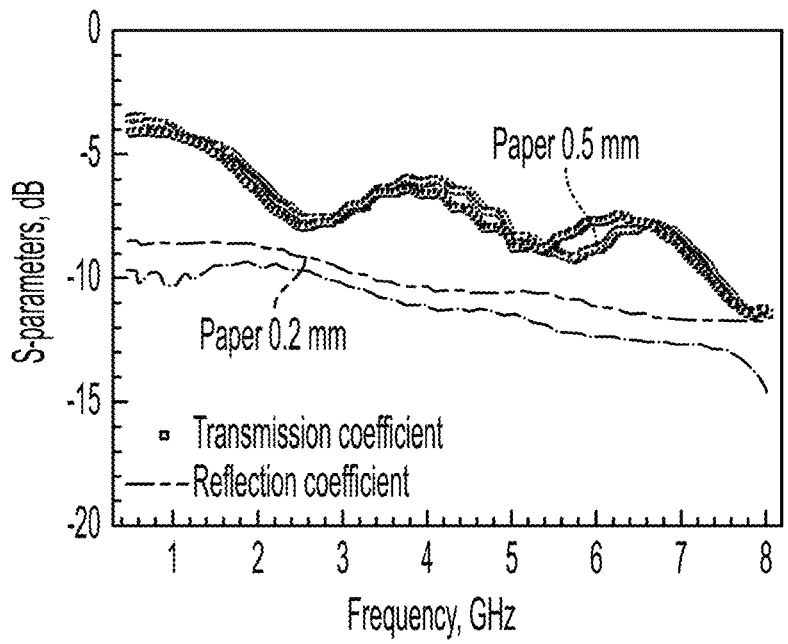
Figure 8F:
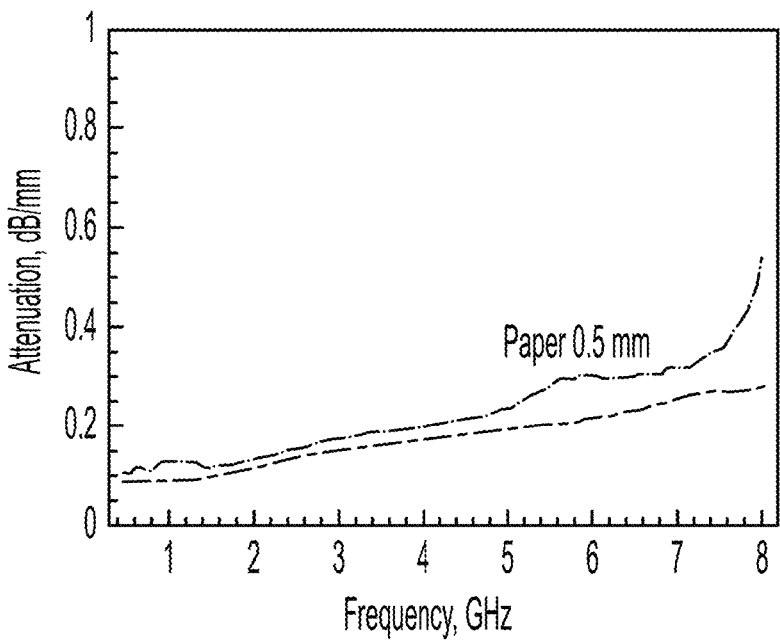

Moving towards wearable devices, samples were also prepared using printing paper as a substrate for making MXene TLs. Spraying MXene ink on paper led to penetration of $Ti_3C_2$ solution into the fiber texture of the paper. The flakes were matching randomly distributed paper microfibers which led to lower conductivity (see Table 1). However, FIGS. 8E-F show comparable performance with the aligned sprayed MXene film.

TABLE 1

Resistance and conductivity values for the materials for transmission line

| Substrate | Thickness, mm | Resistance, Ohms/sq | Bulk conductivity, S/cm |
|---|---|---|---|
| Paper | 0.24 | 7 | 714 |
|  | 0.48 | 11 | 454 |
| PET | 0.002 | 1 | 5000 |
| Rolled film | 0.03 | 0.4 | 1250 |

Figure 9:
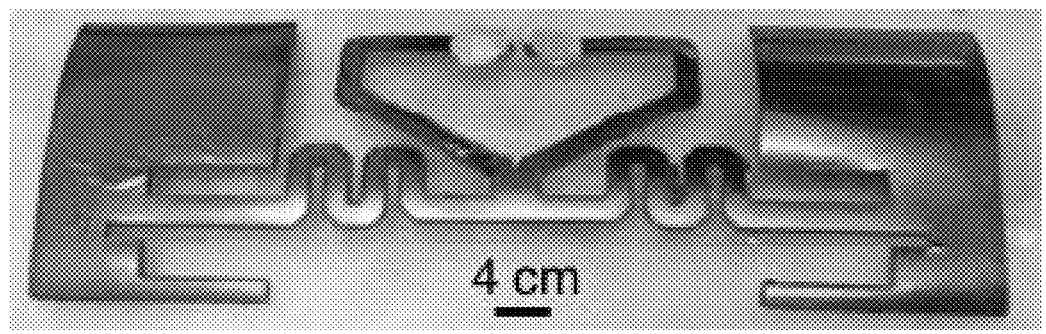
FIG. 9 shows a photo of a MXene RFID antenna

According to these results, TLs and dipole antennas comprising MXene were shown to be good candidates for RFID antennas. The designed and fabricated MXene RFID antennas as shown in FIG. 9. The RFID chip is UCODE 7, the working range is from 860 MHz to 960 MHz. With sprayed MXene ink solution on paper it was possible to reach the working distance 8 meters.

The following references may be useful in understanding some of the concepts described in this application. They do not constitute any admission of prior art to this application 1. Lamminen. Antti, et al. "Graphene-Flakes Printed Wideband Elliptical Dipole Antenna for Low Cost Wireless Communications Applications." *IEEE Antennas and Wireless Propagation Letters* (2017).
2. Huang, Xianjun, et al. "Binder-free highly conductive graphene laminate for low cost printed radio frequency applications" *Applied Physics Letters* 106.20 (2015) 203105.
3. Shin. Keun-Young, Sunghun Cho, and Jyongsik Jang. "Graphene/Polyanilne/Poly (4-styrenesulfonate) Hybrid Film with Uniform Surface Resistance and Its Flexible Dipole Tag Antenna Application." *small* 9.22 (2013) 3792-3798.
4. Sidén, Johan, et al. "Reduced amount of conductive ink with gridded printed antennas." *Polymers and Adhesives in Microelectronics and Photonics, Polytronic.* 2005. Polytronic 2005. 5*th International Conference on.* IEEE, 2005.
5. Pozar, David M. *Microwave engineering.* John Wiley & Sons. 2009.
6. Huang. Xianjun, et al. "Graphene radio frequency and microwave passive components for low cost wearable electronics." *2D Materials* 3.2 (2016): 025021.
7. Chiolerio, Alessandro, et al. "Ag nanoparticle-based inkjet printed planar transmission lines for RF and microwave applications, considerations on ink composition, nanoparticle size distribution and sintering time." *Microelectronic Engineering* 97 (2012): 8-15.
8. Ghidiu, Michael, et al "Conductive two-dimensional titanium carbide 'clay' with high volumetric capacitance." *Nature* 516.7529 (2014): 78.

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document and the Appendices attached to this specification are hereby incorporated herein by reference, each in its entirety, for all purposes, or at least for the purpose described in the context in which the reference was presented.

What is claimed:
1. A wearable device, comprising:
   an antenna-comprising portion, the antenna-comprising portion including therein or
   thereon an antenna comprising a MXene composition that comprises:
   (a) at least one layer having first and second surfaces, each layer described by a formula $M_{n+1}X_nT_x$ and comprising:
   substantially two-dimensional array of crystal cells, each crystal cell having an empirical formula of $M_{n+1}X_n$, such that
   each X is positioned within an octahedral array of M, wherein
   M is at least one Group IIIB, IVB, VB, or VIB metal, wherein
   each X is C, N, or a combination thereof;
   n=1, 2, or 3; and wherein
   $T_x$ represents surface termination groups; or
   (b) at least one layer having first and second surfaces, each layer comprising:
   a substantially two-dimensional array of crystal cells,
   each crystal cell having an empirical formula of $M'_2M''_nX_{n+1}T_x$, such that each X is positioned within an octahedral array of M' and M", and where M"$_n$ are present as individual two-dimensional array of atoms intercalated between a pair of two-dimensional arrays of M' atoms,
   wherein M' and M" are different Group IIIB, IVB, VB, or VIB metals,
   wherein each X is C, N, or a combination thereof;
   n=1 or 2; and wherein
   $T_x$ represents surface termination groups.
2. The wearable device of claim 1, wherein the wearable device is a Bluetooth- or other wireless-enable device.
3. An antenna component, comprising:
   a substrate,
   the substrate comprising a metal, a metalloid, a metal oxide, an organic material, an inorganic material, a synthetic fiber, or a natural fiber; and
   a MXene composition present as a coating on a substrate, the MXene composition comprising:
   a) at least one layer having first and second surfaces, each layer described by a formula $M_{n+1}X_n T_x$ and comprising:
   substantially two-dimensional array of crystal cells, each crystal cell having an empirical formula of $M_{n+1}X_n$, such that
   each X is positioned within an octahedral array of M, wherein
   M is at least one Group IIIB, IVB, VB, or VIB metal, wherein
   each X is C, N, or a combination thereof;
   n=1, 2, or 3; and wherein
   $T_x$ represents surface termination groups; or

(b) at least one layer having first and second surfaces, each layer comprising:
a substantially two-dimensional array of crystal cells,
each crystal cell having an empirical formula of $M'_2M''_nX_{n+1}T_x$, such that each X is positioned within an octahedral array of M' and M", and where $M''_n$ are present as individual two-dimensional array of atoms intercalated between a pair of two-dimensional arrays of M' atoms,
wherein M' and M" are different Group IIIB, IVB, VB, or VIB metals,
wherein each X is C, N, or a combination thereof;
n=1 or 2; and wherein
$T_x$ represents surface termination groups.

4. The antenna component of claim 3, wherein the organic material comprises an organic polymer.

5. The antenna component of claim 4, wherein the organic polymer comprises an acrylate, a methacrylate, polyvinyl alcohol, an epoxy, or a polyurethane.

6. The antenna component of claim 4, wherein the organic polymer comprises a fluorinated polymer, a perfluorinated polymer, or an alginate polymer.

7. The antenna component of claim 6, wherein the perfluorinated polymer comprises PVDF or PTFE.

8. The antenna component of claim 3, wherein the substrate comprises a glass, silicon, GaAs, a carbide, or a nitride.

9. The antenna component of claim 8, wherein the substrate comprises silicon.

10. The antenna component of claim 8, wherein the glass is a silica-based or a boron-based glass.

11. The antenna component of claim 8, wherein the carbide comprises SiC.

12. The antenna component of claim 8, wherein the nitride comprises $Al_3N_4$.

13. The antenna component of claim 3, wherein the metal comprises Ag, Au, Cu, Pd, or Pt.

14. The antenna component of claim 3, wherein the metal oxide comprises $SiO_2$ or indium tin oxide.

15. The antenna component of claim 3, wherein the substrate is characterized as a fabric.

16. The antenna component of claim 3, wherein the substrate is characterized as porous.

17. The antenna component of claim 16, wherein the substrate is characterized as being an aerogel.

18. A receiver/transmitter, comprising:
an antenna portion, the antenna portion comprising a MXene composition that includes
(a) at least one layer having first and second surfaces, each layer described by a formula $M_{n+1}X_nT_x$ and comprising:
a substantially two-dimensional array of crystal cells,
each crystal cell having an empirical formula of $M_{n+1}X_n$, such that
each X is positioned within an octahedral array of M, wherein
M is at least one Group IIIB, IVB, VB, or VIB metal, wherein
each X is C, N, or a combination thereof;
n=1, 2, or 3; and wherein
$T_x$ represents surface termination groups; or
(b) at least one layer having first and second surfaces, each layer comprising:
a substantially two-dimensional array of crystal cells,
each crystal cell having an empirical formula of $M'_2M''_nX_{n+1}T_x$, such that each X is positioned within an octahedral array of M' and M", and where $M''_n$ are present as individual two-dimensional array of atoms intercalated between a pair of two-dimensional arrays of M' atoms,
wherein M' and M" are different Group IIIB, IVB, VB, or VIB metals,
wherein each X is C, N, or a combination thereof;
n=1 or 2; and wherein
$T_x$ represents surface termination groups,
the antenna portion (i) exhibiting a peak return loss of greater than 40, 41, 42, 43, 44, or 45 dB.

19. The receiver/transmitter of claim 18, wherein the antenna portion exhibits a peak return loss of greater than 40 dB.

20. The receiver/transmitter of claim 18, wherein the antenna portion exhibits a peak return loss of greater than 45 dB.

* * * * *